(12) United States Patent
Sembhi et al.

(10) Patent No.: US 11,153,079 B2
(45) Date of Patent: Oct. 19, 2021

(54) SYSTEMS AND METHODS FOR UTILIZING QUANTUM ENTROPY FOR SECURE VIRTUAL PRIVATE NETWORK CONNECTIONS

(71) Applicant: Verizon Patent and Licensing Inc., Arlington, VA (US)

(72) Inventors: Tarvinder S. Sembhi, Philadelphia, PA (US); Junaid Islam, San Jose, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 67 days.

(21) Appl. No.: 16/694,866

(22) Filed: Nov. 25, 2019

(65) Prior Publication Data
US 2021/0160062 A1 May 27, 2021

(51) Int. Cl.
*H04L 9/08* (2006.01)
*H04L 29/06* (2006.01)
*H04L 29/08* (2006.01)

(52) U.S. Cl.
CPC .......... *H04L 9/0852* (2013.01); *H04L 9/0869* (2013.01); *H04L 63/0272* (2013.01); *H04L 63/061* (2013.01); *H04L 67/1078* (2013.01); *H04L 67/42* (2013.01)

(58) Field of Classification Search
None
See application file for complete search history.

(56) References Cited

U.S. PATENT DOCUMENTS

| 7,720,975 | B2* | 5/2010 | Erickson | H04L 67/288 |
| | | | | 709/227 |
| 9,813,520 | B2* | 11/2017 | Erickson | H04L 67/1097 |
| 2016/0344836 | A1* | 11/2016 | Erickson | H04L 67/148 |

* cited by examiner

*Primary Examiner* — William J. Goodchild

(57) ABSTRACT

A device may establish a connection with a first server device based on a request to establish a peer-to-peer connection between a first client device, associated with the first server device, and a second client device associated with a second server device, and may generate a plurality of quantum random numbers based on establishing the connection with the first server device and based on the request to establish the peer-to-peer connection. The device may generate encryption keys for the first client device and the second client device based on the plurality of quantum random numbers, and may provide the encryption keys to the first client device and the second client device to cause an encrypted peer-to-peer connection to be established between the first client device and the second client device, via an interface provided between the first server device and the second server device.

19 Claims, 12 Drawing Sheets

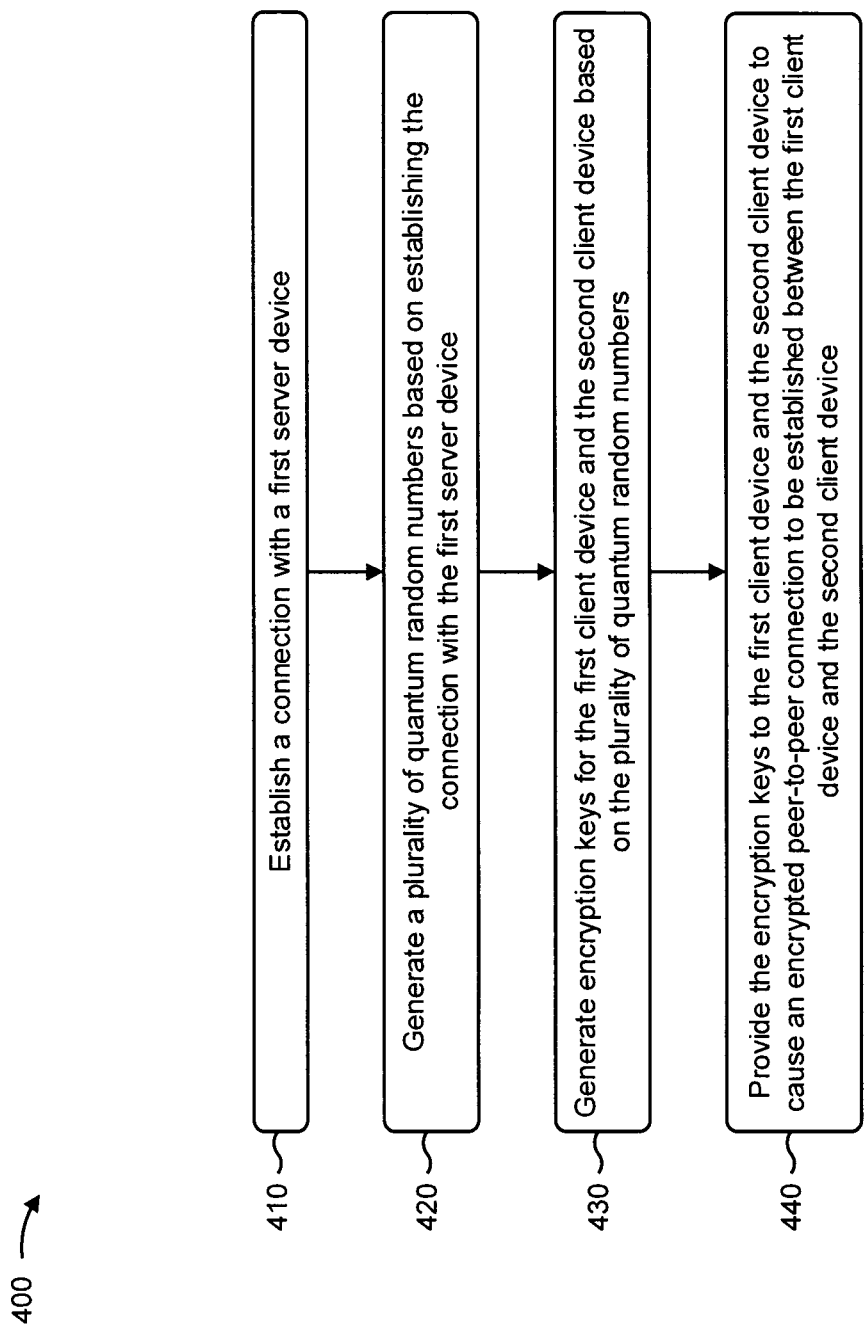

SYSTEMS AND METHODS FOR UTILIZING QUANTUM ENTROPY FOR SECURE VIRTUAL PRIVATE NETWORK CONNECTIONS

BACKGROUND

Network security is the process of taking physical and software preventative measures to protect a network infrastructure from unauthorized access, misuse, malfunction, modification, destruction, improper disclosure, and/or the like. Network security creates a secure platform for computing devices, users, software programs, and/or the like to perform functions within a secure environment.

BRIEF DESCRIPTION OF THE DRAWINGS

FIG. 4 is a flow chart of an example process for utilizing quantum entropy for secure virtual private network connections.

DETAILED DESCRIPTION OF PREFERRED EMBODIMENTS

Figure 1A:
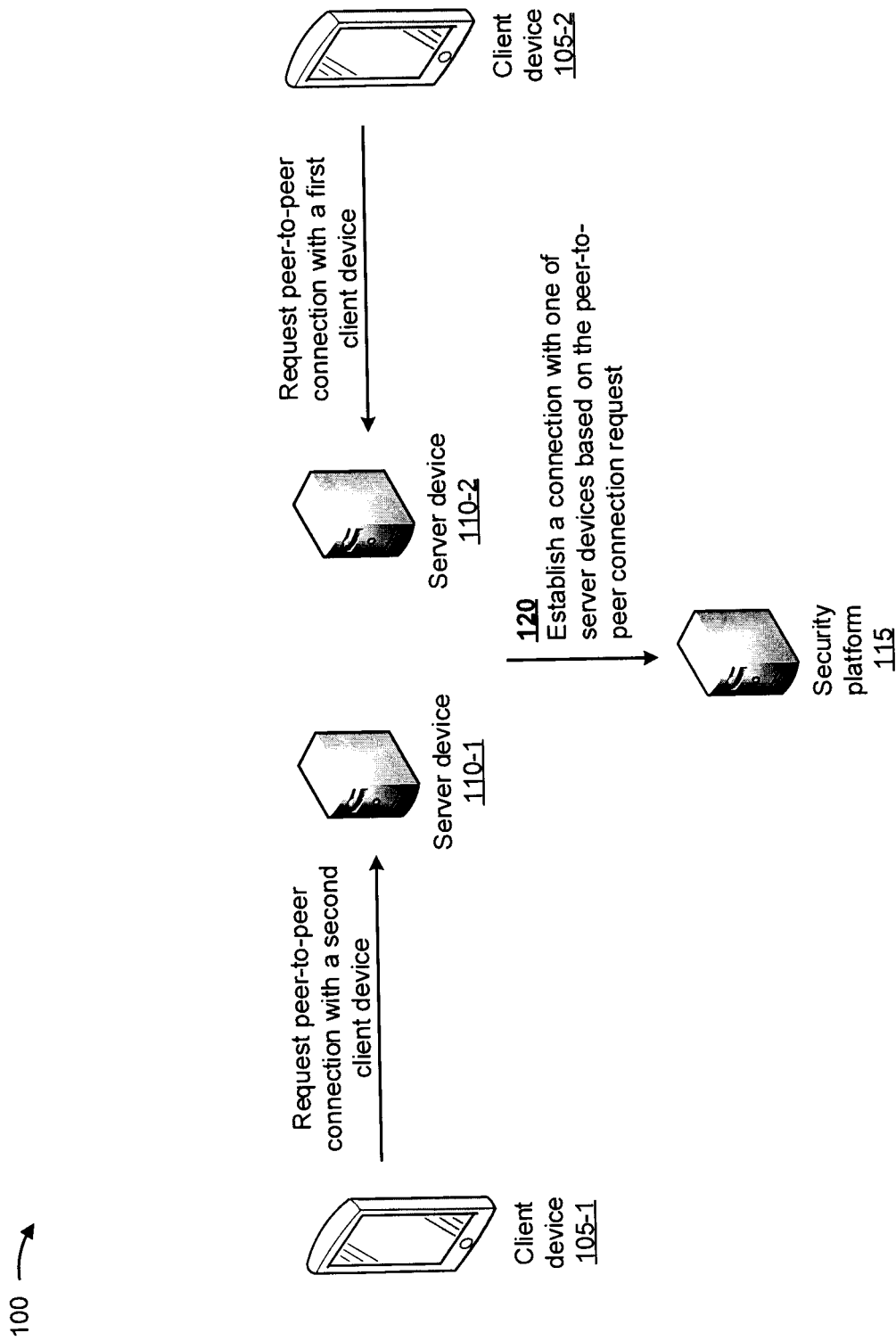
FIGS. 1A-1I are diagrams of one or more example implementations described herein.

The following detailed description of example implementations refers to the accompanying drawings. The same reference numbers in different drawings may identify the same or similar elements.

Several network attacks have occurred due to weakness, or predictability, of public key infrastructure (PKI) certificates and public keys due to low-entropy random number sources. Network attacks include analysis of random numbers used in known or suspected entropy sources employed by hardware and software, which leads to a constrained key selection space. This means that an attacker (e.g., a malicious user) has a much higher probability of guessing a public key. Headless servers (e.g., that lack user input, such as keyboard activity), systems at startup, and Internet of Things (IOT) devices (e.g., that lack memory and processor capacity) are known to be entropy starved. Furthermore, foreign-sourced chips and systems suffer from predictable non-random output or may include purposely built-in exploitation vulnerabilities. This results in network security issues, such as network attacks and network data exploitation. Thus, current networks waste resources (e.g., computing resources, networking resources, and/or the like) associated with monitoring network security issues, correcting network security issues discovered during monitoring, handling loss of data or network inoperability due to the network security issues, and/or the like.

Some implementations described herein provide a security platform that utilizes quantum entropy to provide secure on-demand virtual private network connections (VPNs). An on-demand VPN may create a secure group between any set of users (e.g., client devices), such as a user that wishes to purchase a vehicle and share financial docs with a dealer, a user that wishes to send credit card details, and/or the like. For example, the security platform may establish a connection with a first server device based on a request to establish a peer-to-peer connection between a first client device, associated with the first server device, and a second client device associated with a second server device. The security platform may generate a plurality of quantum random numbers based on establishing the connection with the first server device and based on the request to establish the peer-to-peer connection. The security platform may generate encryption keys for the first client device and the second client device based on the plurality of quantum random numbers. The security platform may provide the encryption keys to the first client device and the second client device to cause an encrypted peer-to-peer connection to be established between the first client device and the second client device, via an interface provided between the first server device and the second server device.

In this way, the security platform utilizes quantum entropy for secure virtual private network connections. The security platform provides encryption keys, based on quantum random numbers, to client devices so that the client devices may conduct secure communications via a secure connection. For example, if two or more client devices establish a communication channel or perform a transaction, the security platform provides a service that enables secure peer-to-peer communications between the client devices based on the encryption keys. The client devices may utilize a trusted and secure peer-to-peer communication channel to communicate, without sharing personal information. Thus, the security platform conserves computing resources (e.g., processing resources, memory resources, communication resources), networking resources, and/or the like that would otherwise be wasted in monitoring network security issues, correcting network security issues discovered during monitoring, handling loss of data or network inoperability due to the network security issues, and/or the like.

FIGS. 1A-1I are diagrams of one or more example implementations 100 described herein. As shown in FIG. 1A, client devices 105 (e.g., a first client device 105-1 and a second client device 105-2) may be associated with server devices 110 (e.g., a first server device 110-1 and a second server device 110-2) and a security platform 115. Client devices 105 may include mobile devices, computers, telephones, set-top boxes, and/or the like that users may utilize to interact with and/or retrieve information from server devices 110 or other client devices 105. Server devices 110 may include devices that provide applications and/or services (e.g., digital wallet applications, telephone services, text messaging applications, and/or the like). Security platform 115 may include a platform that utilizes quantum entropy to provide secure virtual private network connections between client devices 105. Although two client devices 105 and two server devices 110 are depicted in FIG. 1A, implementations described herein may be utilized with more than two client devices 105 and more than two server devices 110.

As further shown in FIG. 1A, server device 110-1 may receive, from client device 105-1, a request for a peer-to-peer connection with client device 105-2, and server device 110-2 may receive, from client device 105-2, a request for a peer-to-peer connection with client device 105-1. Based on the requests for the peer-to-peer connection, server device 110-1 and/or server device 110-2 may establish a connection with security platform 115 so that security platform 115 may enable a secure peer-to-peer connection between client devices 105.

For example, as further shown in FIG. 1A and by reference number 120, security platform 115 may establish a connection with one of server devices 110 (e.g., with server device 110-1 or server device 110-2) based on the peer-topeer connection request. In some implementations, security platform 115 may establish the connection with one of server devices 110 so that security platform 115 may provide software-defined perimeter (SDP) services for the peer-to-peer connection between client devices 105.

Figure 1B:
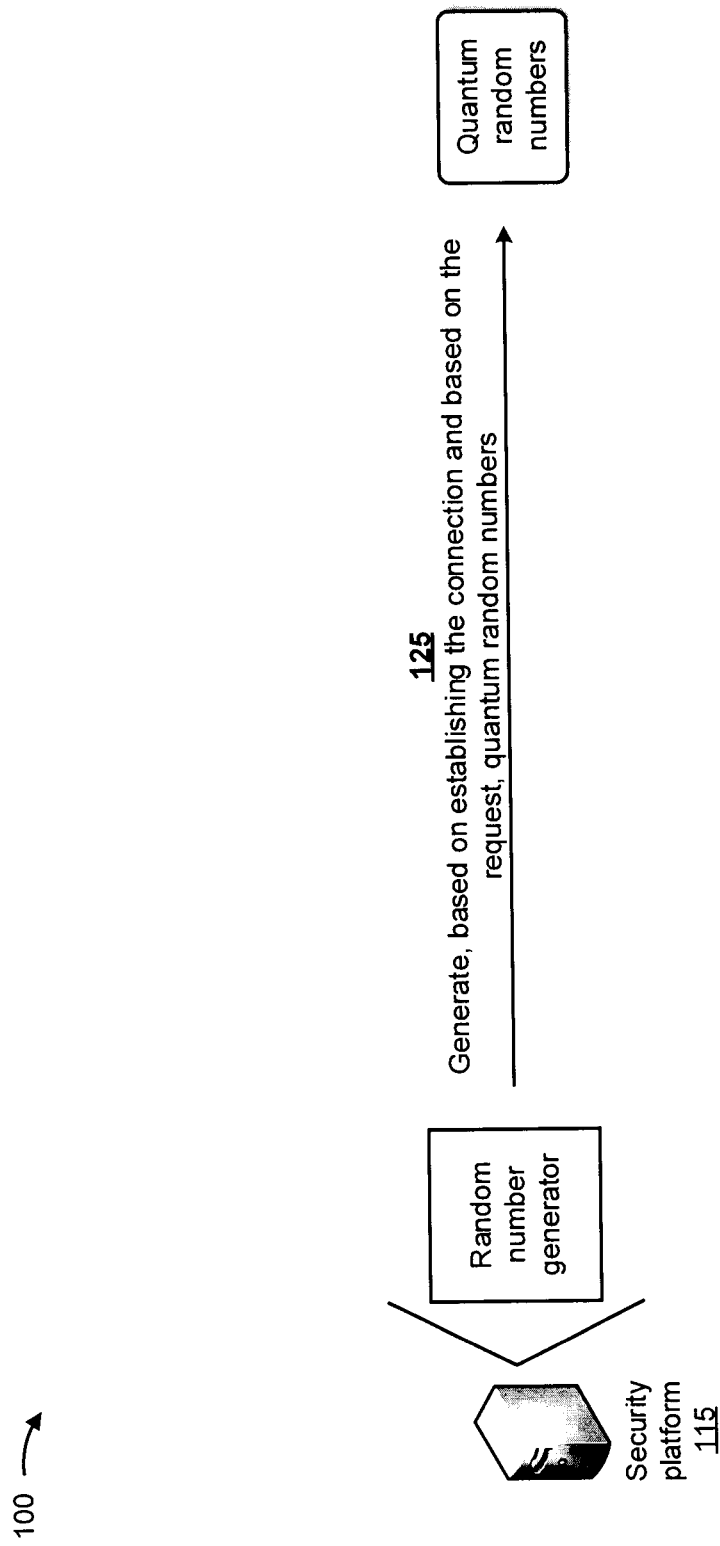

As shown in FIG. 1B, and by reference number 125, security platform 115 may generate, based on establishing the connection with one of server devices 110 and based on the peer-to-peer connection request, quantum random numbers. In some implementations, the quantum random numbers may include unbiased random variable numbers with linear independence, non-repeating patterns, and non-dominant frequencies. For example, the quantum random numbers may include unbiased random variables with correct ones and zeros densities, may not include linear dependence when viewed as a matrix, may not include repeating patterns, may not include dominant frequency when examined with a discrete Fourier transform, and/or the like. In some implementations, the quantum random numbers may be undecipherable by a quantum computer, may include independent, identically distributed binary data that is ideal for use as encryption keys, and/or the like.

In some implementations, security platform 115 may include and/or utilize a quantum random number generator (QRNG) system that generates the quantum random numbers. In some implementations, security platform 115 may include multiple quantum random number generators that generate multiple quantum random numbers. The multiple quantum random number generators may operate in parallel to produce a volume of entropy consumed by encryption key generators and to provide resilience needed in case of a failure of one or more of the quantum random number generators. In some implementations, the multiple quantum random number generators may provide the multiple quantum random numbers to client devices 105 and/or server devices 110 via a secure mechanism (e.g., links secured with PKI).

Figure 1C:
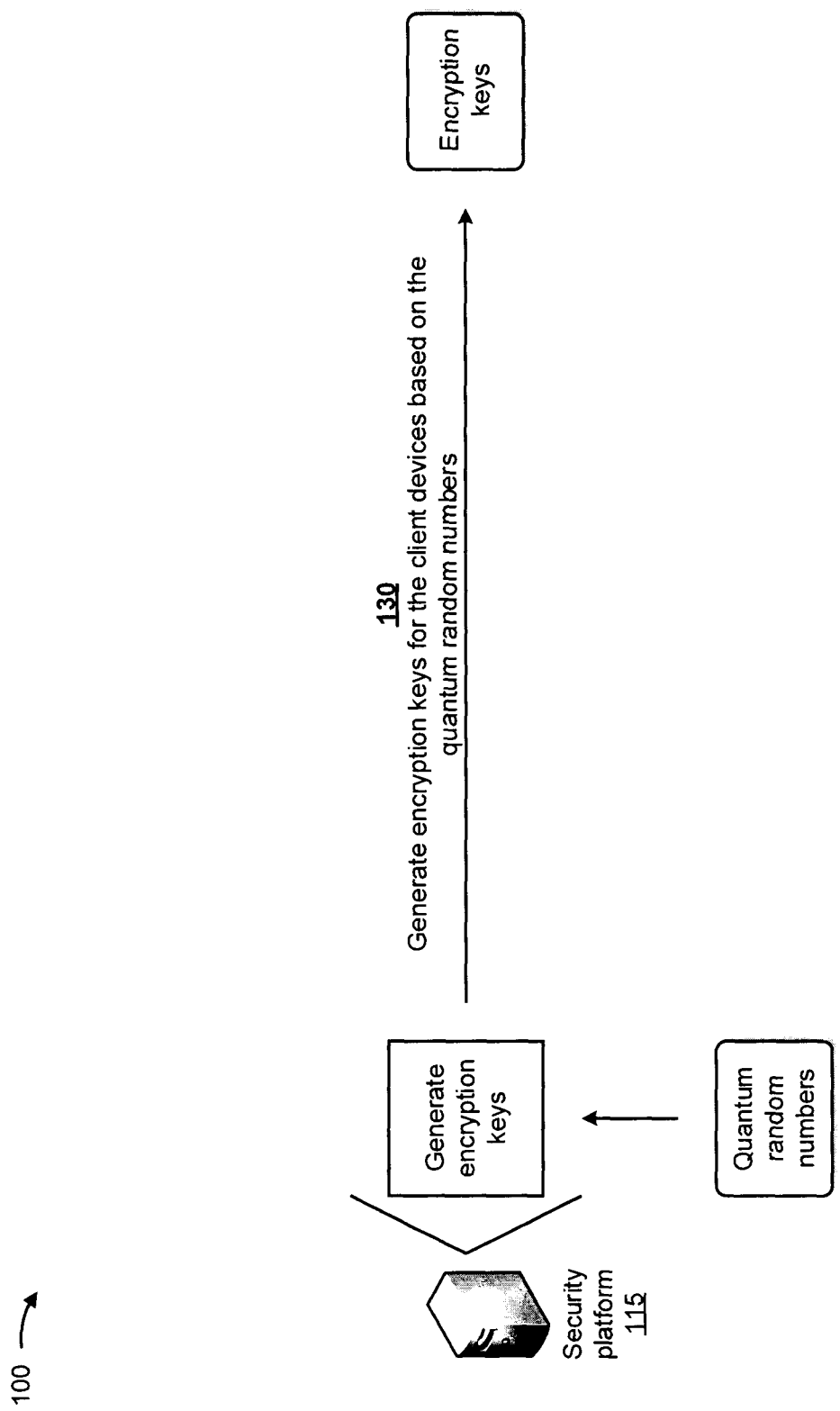

As shown in FIG. 1C, and by reference number 130, security platform 115 may generate encryption keys for client devices 105 based on the quantum random numbers. For example, security platform 115 may generate distinct encryption keys for each of client devices 105 based on the quantum random numbers. In some implementations, a distinct encryption key may include a secret distinct shared encryption key that is only known to client device 105. This distinct encryption key may prevent vulnerability of public key handshakes between client devices 105 because the distinct encryption key is only known to client devices 105. In some implementations, security platform 115 may generate a lifetime of encryption keys that are unique on a per connection basis for connections between client devices 105. In some implementations, an encryption key may be renewed by using a counter and random numbers generated by client devices 105 to generate a new key for each session, and only client devices 105 may know how to create the new key because only client devices 105 have access to the encryption key.

In some implementations, the encryption key may provide perfect forward secrecy for communications between client devices 105 and server devices 110 and/or between client devices 105. This means that even if an encrypted communication is recorded and, at a later point, a public key generated by client device 105 is compromised, the communication still cannot be decrypted. This is because a component of the public key (e.g., the encryption key) is never exposed in plain text or stored by client devices 105 and/or server devices 110. In some implementations, the distinct encryption key may include a random string of bits created explicitly for scrambling and unscrambling data. Security platform 115 may utilize the quantum random numbers and/or information about client devices 105 (e.g., identifiers of client devices 105) to ensure that every encryption key is unpredictable, is unique, includes a length that is difficult to decipher, and/or the like.

Figure 1D:
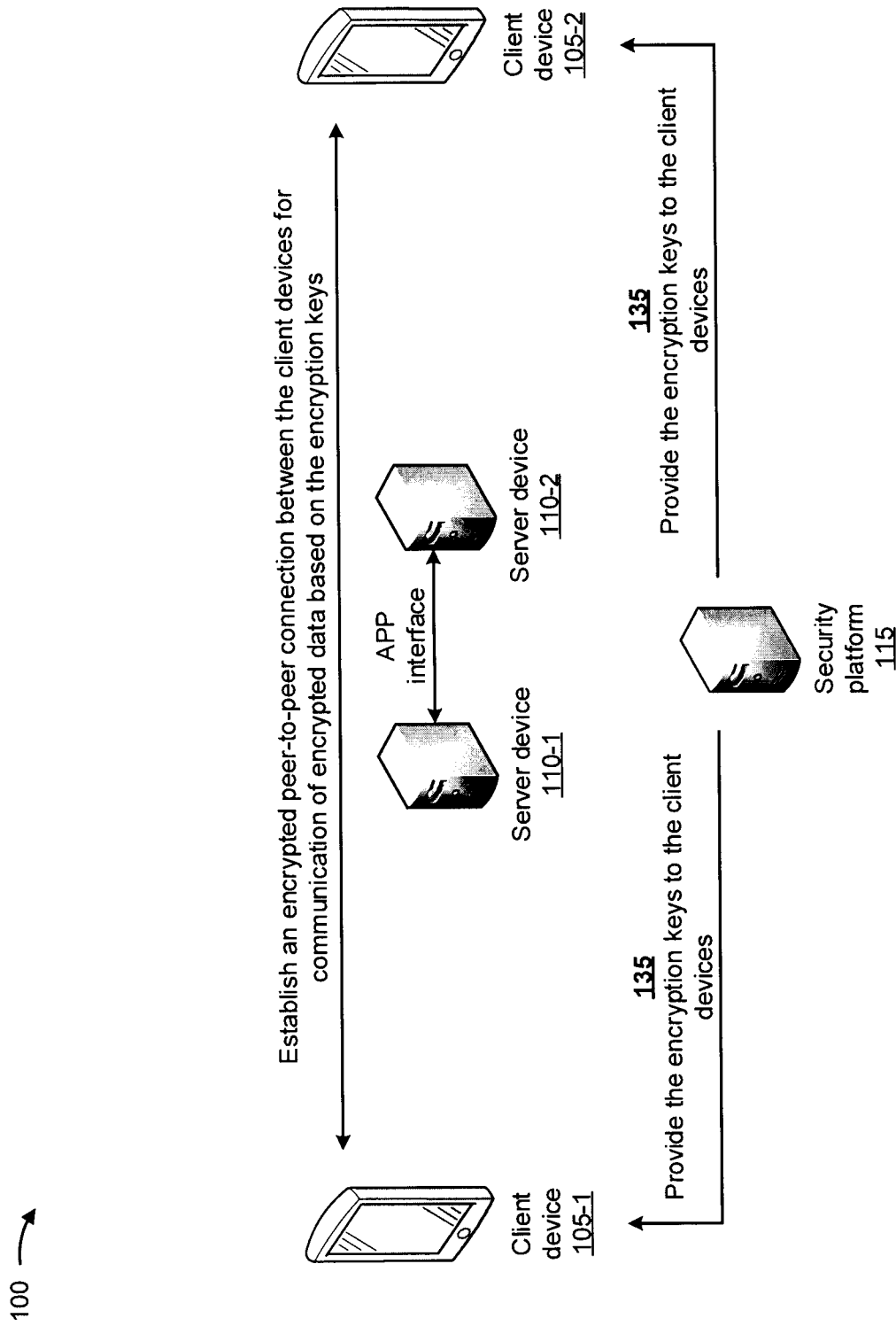

As shown in FIG. 1D, and by reference number 135, security platform 115 may provide the encryption keys to client devices 105. For example, security platform 115 may provide the encryption keys to client devices 105 in near-real time relative to establishing the connection with one of server devices 110. In some implementations, security platform 115 may utilize an entropy-as-a-service (EaaS) to provide the encryption keys to client devices 105. In computing, entropy is a measure of randomness or unpredictability of data that is utilized to generate cryptographic keys that require random data. EaaS provides high-quality sources of entropy to Internet of Things (IoT) devices, embedded systems, cloud service providers, client devices 105, server devices 110, and/or the like. Developers can use EaaS for seeding applications or devices with high-quality entropy and to ensure that the applications or devices are strongly protected against cyberattacks.

In some implementations, security platform 115 may utilize EaaS to provide entropy blocks to client devices 105. The entropy blocks may include blocks that may be utilized by client devices 105 to provide randomness to the encryption keys. In some implementations, client devices 105 may utilize the entropy blocks to modify security of secure communications between client devices 105. In some implementations, security platform 115 may provide the entropy blocks as real-time streams to client devices 105. Alternatively, or additionally, security platform 115 may securely store the entropy blocks for subsequent retrieval by client devices 105 engaged in encryption. In some implementations, client devices 105 may authenticate with the EaaS, entropy blocks may be digitally signed and time-stamped, no entropy block may be delivered more than once to prevent duplication, and/or the like. In some implementations, security platform 115 may utilize entropy blocks of the EaaS with the quantum random numbers to generate the encryption keys. In this way, security platform 115 may further enhance the security of the encryption keys. Furthermore, quantum-based entropy strengthens existing cryptographic systems to withstand attacker hypothetical use of a quantum computer.

As further shown in FIG. 1D, an encrypted peer-to-peer connection may be established between client devices 105 for communication of encrypted data, based on the encryption keys and via an application (APP) interface provided between server device 110-1 and server device 110-2. In some implementations, client devices 105 may enter into a secure mode based on establishment of the encrypted peer-to-peer connection. In some implementations, security platform 115 may provide, to users of client devices 105, data indicating that client devices 105 are in the secure mode (e.g., by causing client devices 105 to change colors of user interfaces, to display icons, and/or the like). In some implementations, security platform 115 may provide, to a communication provider (e.g., a wireless carrier) associated with client devices 105, data indicating that client devices 105 are in the secure mode, a length of time during which client devices 105 are in the secure mode, and/or the like. In this way, security platform 115 may enable the communication provider to charge users of client devices 105 for providing the encrypted peer-to-peer connection.

In some implementations, the encrypted peer-to-peer connection may include a virtual private network between client device 105-1 and client device 105-2. In this way, applications executing on client device 105-1 and client device 105-2 may exchange encrypted data that only client device 105-1 and client device 105-2 can read via the application interface established between server device 110-1 and server device 110-2. In some implementations, server device 110-1 and server device 110-2 may be application servers associated with a same application. Additionally, or alternatively, server device 110-1 and server device 110-2 may be application servers associated with different applications.

Figure 1E:
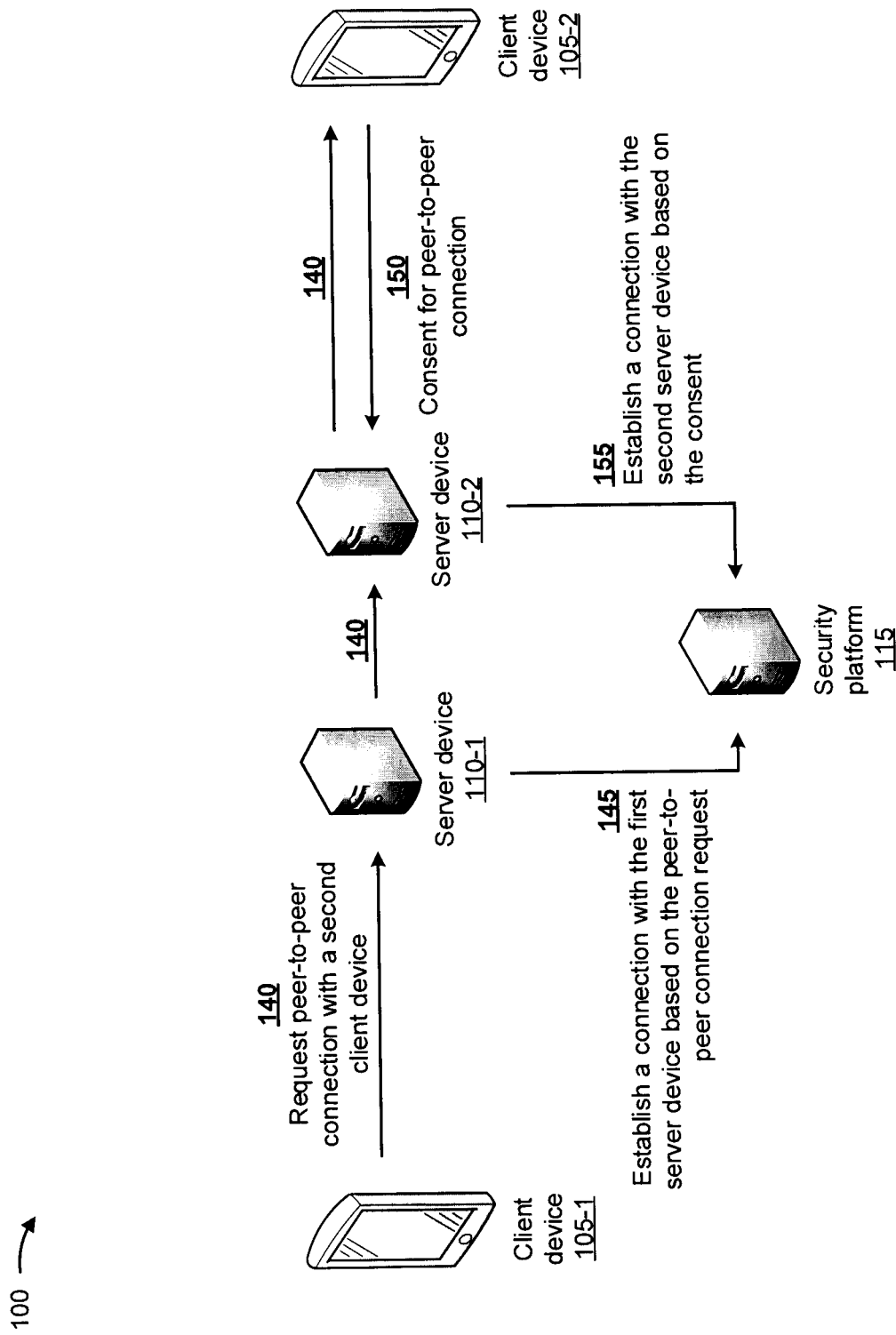

As shown in FIG. 1E, and by reference number 140, server device 110-1 may receive, from client device 105-1, a request for a peer-to-peer connection with client device 105-2. In some implementations, a virtual overlay network, between client device 105-1 and client device 105-2, may be implemented on top of a physical network topology so that client device 105-1 may identify client device 105-2 and vice versa. Server device 110-1 may provide the request for the peer-to-peer connection to server device 110-2, and server device 110-2 may provide the request for the peer-to-peer connection to client device 105-2. Based on the request for the peer-to-peer connection, server device 110-1 may establish a connection with security platform 115 so that security platform 115 may enable a secure peer-to-peer connection between client devices 105.

For example, as further shown in FIG. 1E and by reference number 145, security platform 115 may establish a connection with server device 110-1 based on the peer-to-peer connection request. In some implementations, security platform 115 may establish the connection with server device 110-1 so that security platform 115 may provide SDP services for the peer-to-peer connection between client devices 105.

As further shown in FIG. 1E, and by reference number 150, client device 105-2 may provide, to server device 110-2, data indicating that a user of client device 105-2 consents to establishing the peer-to-peer connection with client device 105-1. For example, based on receiving the peer-to-peer connection request, client device 105-2 may display a user interface that includes data indicating that a user of client device 105-1 wishes to establish a peer-to-peer connection with client device 105-2. The user interface may also include a mechanism (e.g., a link, an icon, a button, and/or the like) that, when selected by the user of client device 105-2, may cause client device 105-2 to provide, to server device 110-2, the data indicating that the user of client device 105-2 consents to establishing the peer-to-peer connection with client device 105-1.

As further shown in FIG. 1E, and by reference number 155, security platform 115 may establish a connection with server device 110-2 based on the data indicating that the user of client device 105-2 consents to establishing the peer-to-peer connection with client device 105-1. In some implementations, security platform 115 may establish the connection with server device 110-2 so that security platform 115 may provide SDP services for the peer-to-peer connection between client devices 105.

In some implementations, security platform 115 may generate quantum random numbers based on establishing the connection with server device 110-1, based on establishing the connection with server device 110-2, based on the peer-to-peer connection request, based on the data indicating that the user of client device 105-2 consents to establishing the peer-to-peer connection with client device 105-1, and/or the like. For example, security platform 115 may generate the quantum random numbers as described above in connection with FIG. 1B. In some implementations, security platform 115 may generate encryption keys for client devices 105 based on the quantum random numbers. For example, security platform 115 may generate the encryption keys as described above in connection with FIG. 1C.

Figure 1F:
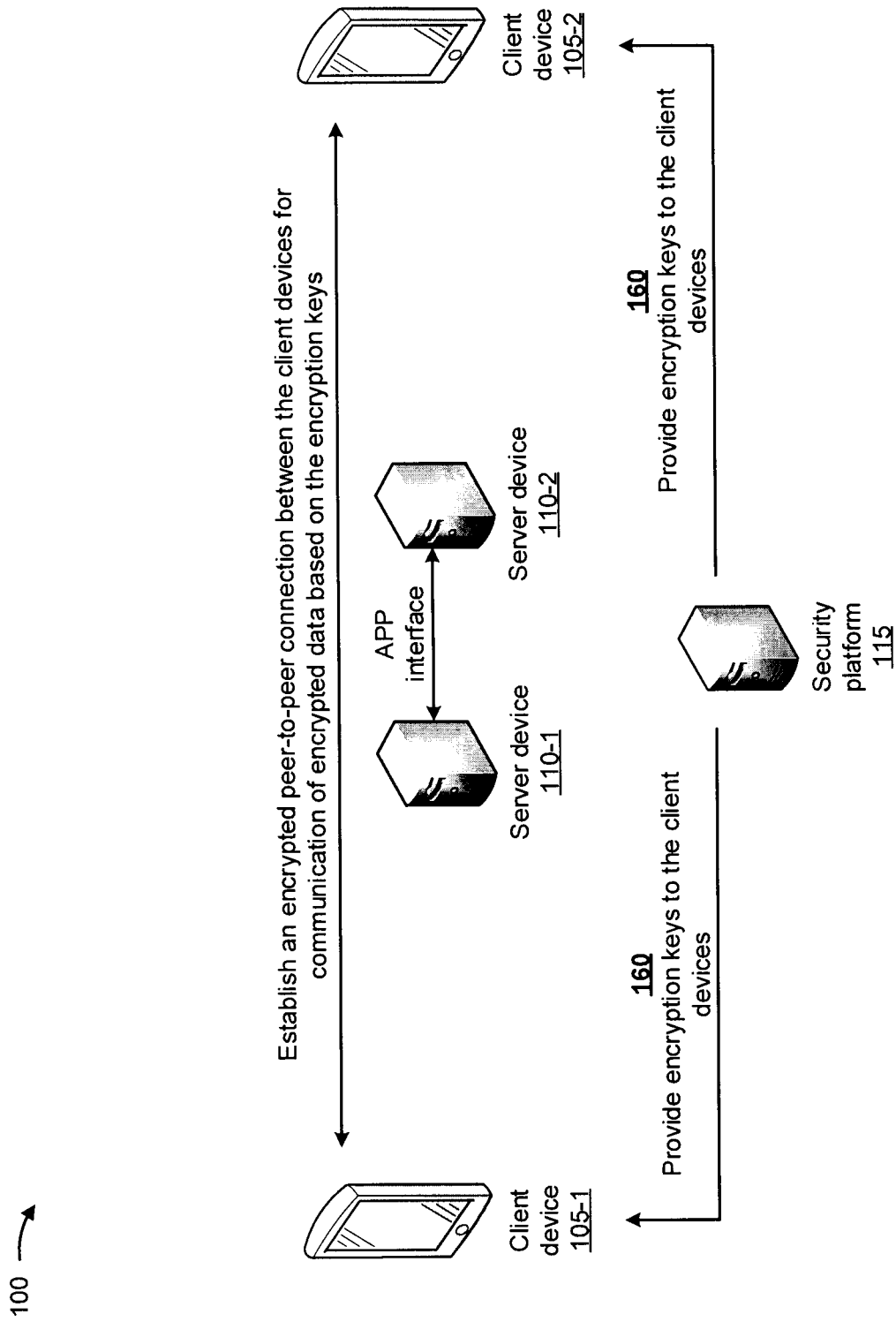

As shown in FIG. 1F, and by reference number 160, security platform 115 may provide the encryption keys to client devices 105. For example, security platform 115 may provide the encryption keys to client device 105-1 and client device 105-2 in near-real time relative to establishing the connections with server device 110-1 and server device 110-2. In some implementations, when providing the encryption keys, security platform 115 may utilize an EaaS, as described above in connection with FIG. 1D. In some implementations, client devices 105 may enter into the secure mode based on establishing the encrypted peer-to-peer connection, may provide to users of client devices 105 data indicating that client devices 105 are in the secure mode, and/or the like, as described above in connection with FIG. 1D. In this case, security platform 115 may provide, to a communication provider, data indicating that client devices 105 are in the secure mode, a length of time during which client devices 105 are in the secure mode, and/or the like. In this way, the communication provider may charge users of client devices 105 for provision of the encrypted peer-to-peer connection.

As further shown in FIG. 1F, an encrypted peer-to-peer connection may be established between client devices 105 for communication of encrypted data, based on the encryption keys and via an application interface provided between server device 110-1 and server device 110-2. In some implementations, the encrypted peer-to-peer connection may include a virtual private network between client device 105-1 and client device 105-2. In this way, applications executing on client device 105-1 and client device 105-2 may exchange encrypted data that only client device 105-1 and client device 105-2 can read and via the application interface provided between server device 110-1 and server device 110-2. In some implementations, server device 110-1 and server device 110-2 may be application servers associated with a same application, application servers associated with different applications, and/or the like.

Figure 1G:
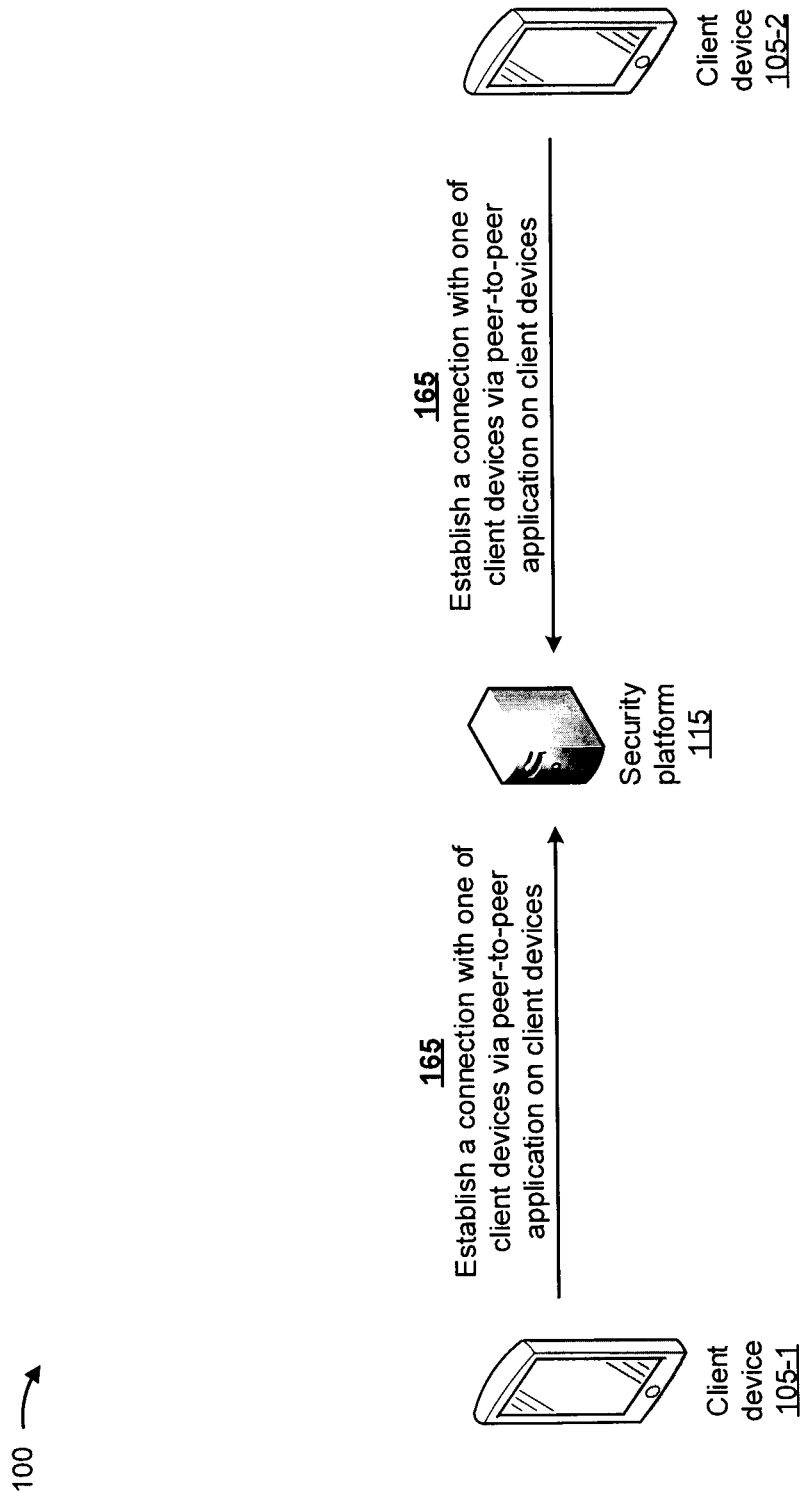
Figure 1H:
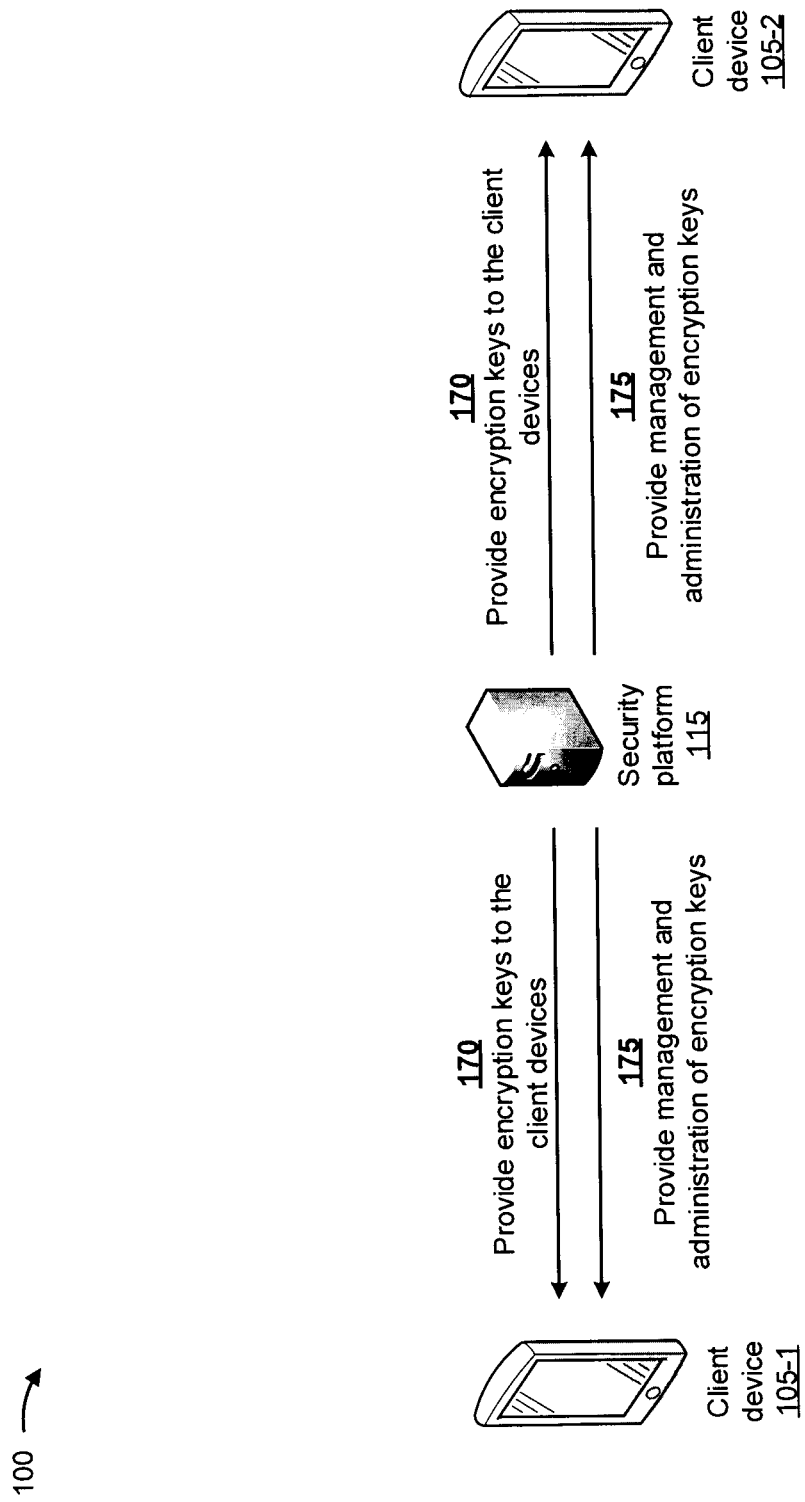
Figure 1I:
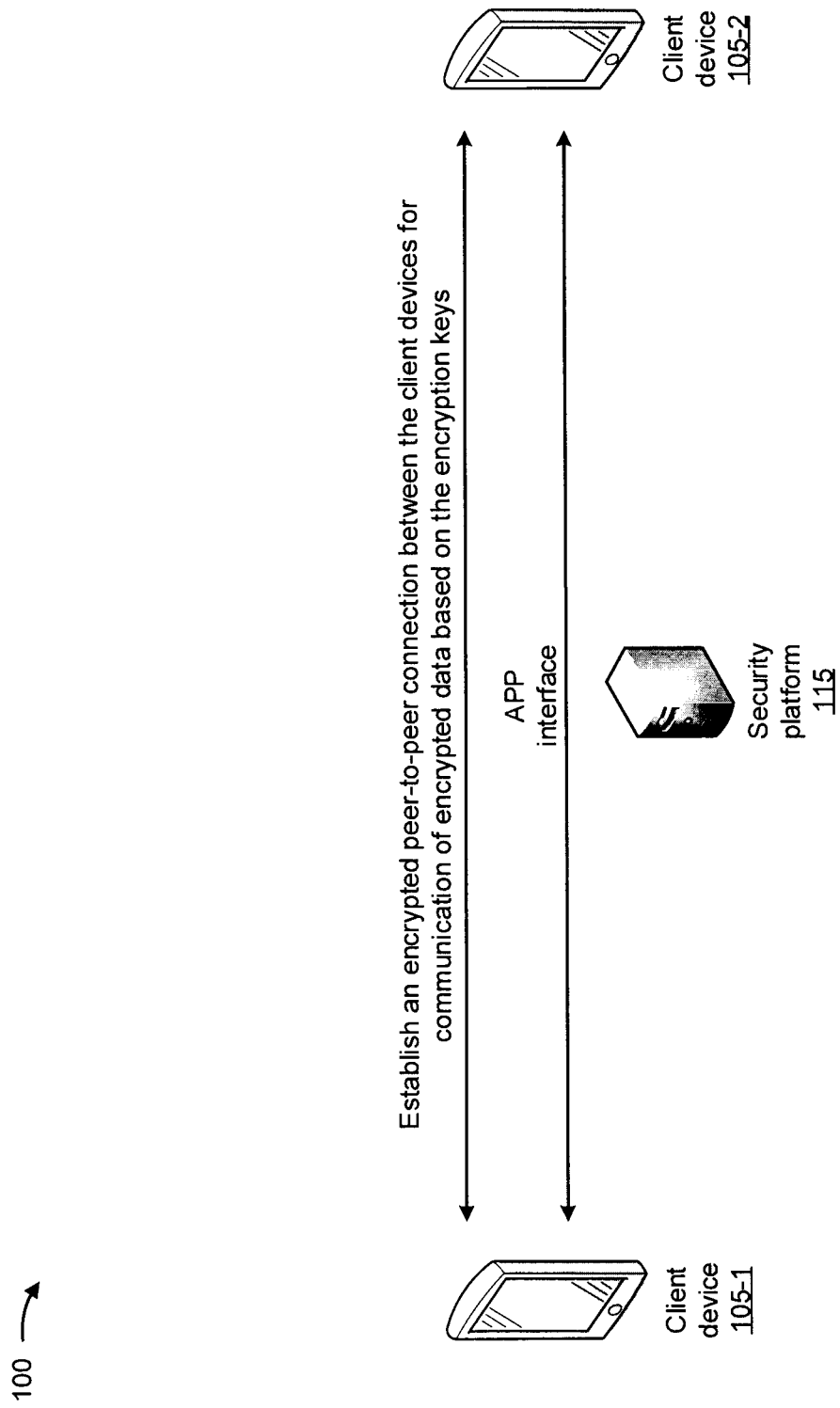

As will be shown in FIGS. 1G-1I, security platform 115 may establish a peer-to-peer connection between client devices 105 without utilizing server devices 110. In this case, each client device 105 may include a peer-to-peer client component of a peer-to-peer application, and security platform 115 may include a peer-to-peer server component of the peer-to-peer application. In some implementations, the peer-to-peer application may be associated with browser-based services initiated from a network application, may include a mobile application integrated into the peer-to-peer client component using an application programming interface (API) and/or a software development kit (SDK), and/or the like.

As shown in FIG. 1G, and by reference number 165, security platform 115 may establish connections with client devices 105 via the peer-to-peer application on client devices 105. In some implementations, security platform 115 may generate quantum random numbers based on establishing the connections with client devices 105. For example, security platform 115 may generate the quantum random numbers as described above in connection with FIG. 1B. In some implementations, security platform 115 may generate encryption keys for client devices 105 based on the quantum random numbers. For example, security platform 115 may generate the encryption keys as described above in connection with FIG. 1C.

As shown in FIG. 1H, and by reference number 170, security platform 115 may provide the encryption keys to client devices 105. For example, security platform 115 may provide the encryption keys to client device 105-1 and client device 105-2 in near-real time relative to establishing the connections with client device 105-1 and client device 105-2. In some implementations, when providing the encryption keys, security platform 115 may utilize an EaaS, as described above.

As further shown in FIG. 1H, and by reference number 175, security platform 115 may provide for management and administration of the encryption keys. For example, security platform 115 may provide peer-to-peer-as-a-service (P2PaaS) for managing and administering the encryption keys. The management and administration of the encryption keys may include security platform 115 utilizing EaaS to provide entropy blocks to client devices 105. The entropy blocks may include blocks that may be utilized by client devices 105 to provide randomness to the encryption keys, as described above. In some implementations, client devices 105 may enter into the secure mode based on establishing the encrypted peer-to-peer connection, may provide, to users of client devices 105, data indicating that client devices 105 are in the secure mode, and/or the like. Security platform 115 may provide, to a communication provider, data indicating that client devices 105 are in the secure mode, a length of time during which client devices 105 are in the secure mode, and/or the like. In this way, security platform 115 may enable the communication provider to charge users of client devices 105 for provision of the encrypted peer-to-peer connection.

As shown in FIG. 1I, security platform 115 may establish an encrypted peer-to-peer connection between client devices 105 for communication of encrypted data based on the encryption keys. For example, security platform 115 may establish the encrypted peer-to-peer connection for communication of encrypted data via an application interface provided directly between client device 105-1 and client device 105-2. In some implementations, the encrypted peer-to-peer connection may include a virtual private network between client device 105-1 and client device 105-2. In this way, applications executing on client device 105-1 and client device 105-2 may exchange encrypted data that only client device 105-1 and client device 105-2 can read via the application interface.

In some implementations, security platform 115 may establish an encrypted peer-to-peer connection between client devices 105 (e.g., based on simultaneous requests from client devices 105, based on sequential requests from client devices 105, without utilizing server devices 110, and/or the like) for utilization with a digital wallet application (e.g., or any application that may be shared with two or more client devices 105). For example, security platform 115 may provide an SDK that allows creation of a secure group, and may store a license and/or other authorizing or authenticating information in the digital wallet application. Thereafter, the digital wallet application may utilize an on demand virtual private network for a short period of time (e.g., seconds) to quickly set up communications for accessing banking information, personal information, and/or the like.

In some implementations, security platform 115 may establish an encrypted peer-to-peer connection between client devices 105 for utilization with IoT devices. For example, security platform 115 may enable creation of a secure virtual private network between client device 105 and an IoT device (e.g., a refrigerator, a temperature sensor, a security camera, and/or the like).

In some implementations, security platform 115 may provide for encrypted peer-to-peer communications, among a group of people, that may be accessed on an ongoing basis. For example, security platform 115 may provide a shared folder that utilizes encryption techniques, as defined herein, to share information among the group of people. In some implementations, security platform 115 may provide for encrypted peer-to-peer communications for selling personal items online, for engaging in online gambling, and/or the like.

Implementations described herein use a rigorous, computerized process to perform tasks or roles that were not previously performed or were previously performed using subjective human intuition or input. For example, currently there does not exist a technique that utilizes quantum entropy for secure virtual private network connections in the manner described herein. Finally, the process for utilizing quantum entropy for secure virtual private network connections improves computing and network security and conserves computing resources, networking resources, and/or the like that would otherwise be wasted in monitoring network security issues, correcting network security issues discovered during monitoring, handling loss of data or network inoperability due to the network security issues, and/or the like.

As indicated above, FIGS. 1A-1I are provided merely as examples. Other examples may differ from what was described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
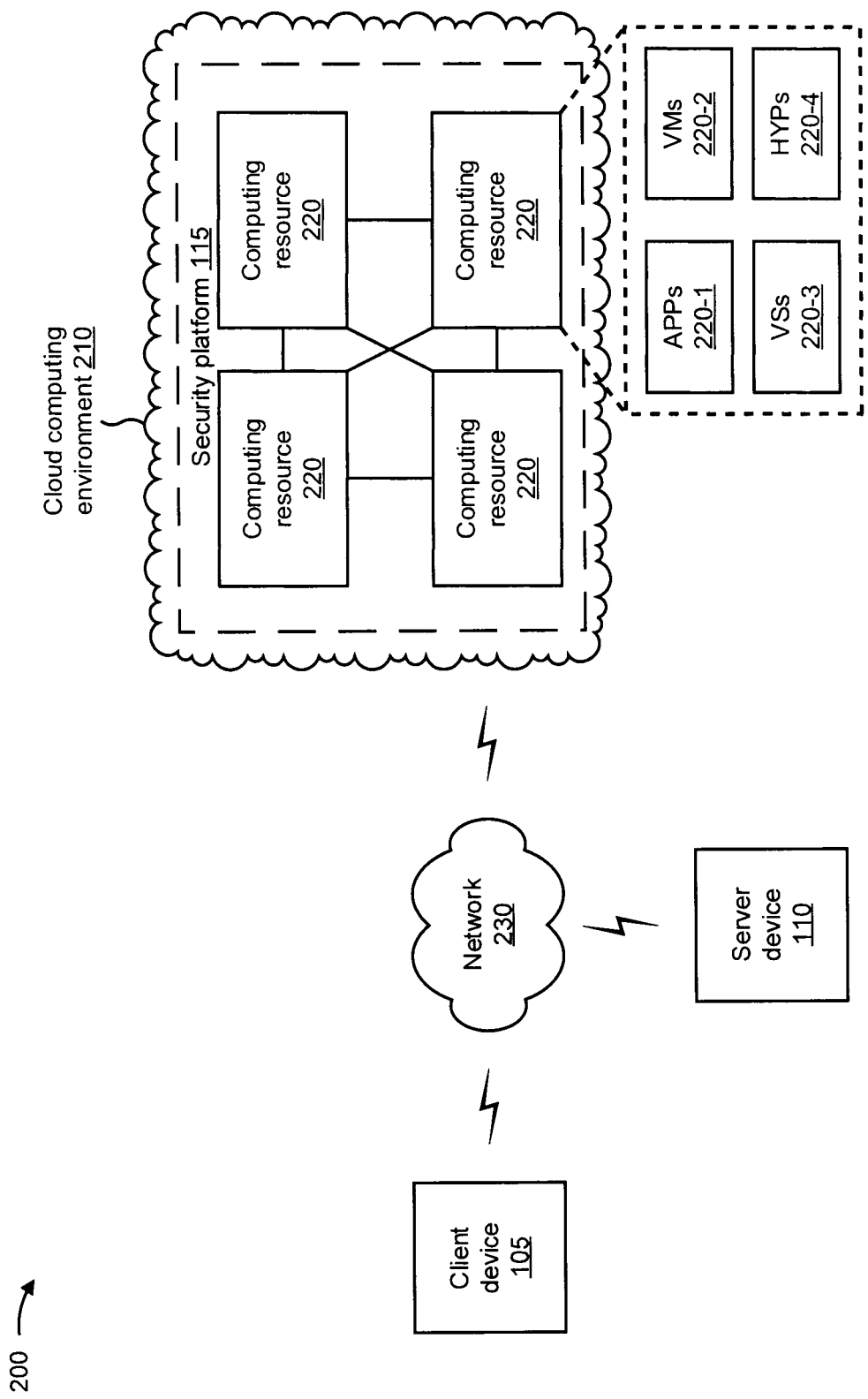
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, server device 110, security platform 115, and a network 230. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a mobile phone (e.g., a smart phone, a radiotelephone, and/or the like), a laptop computer, a tablet computer, a desktop computer, a handheld computer, a set-top box, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 105 may receive information from and/or transmit information to server device 110 and/or security platform 115.

Server device 110 includes one or more devices capable of receiving, generating, storing, processing, and/or providing information, as described herein. For example, server device 110 may include a laptop computer, a tablet computer, a desktop computer, a group of server devices, or a similar type of device. In some implementations, server device 110 may receive information from and/or transmit information to client device 105 and/or security platform 115.

Security platform 115 includes one or more devices that utilize quantum entropy for secure virtual private network connections. In some implementations, security platform 115 may be designed to be modular such that certain software components may be swapped in or out depending on a particular need. As such, security platform 115 may be easily and/or quickly reconfigured for different uses. In some implementations, security platform 115 may receive information from and/or transmit information to one or more client devices 105 and/or server device 110.

In some implementations, as shown, security platform 115 may be hosted in a cloud computing environment 210. Notably, while implementations described herein describe security platform 115 as being hosted in cloud computing environment 210, in some implementations, security platform 115 may not be cloud-based (i.e., may be implemented outside of a cloud computing environment) or may be partially cloud-based.

Cloud computing environment 210 includes an environment that hosts security platform 115. Cloud computing environment 210 may provide computation, software, data access, storage, etc., services that do not require end-user knowledge of a physical location and configuration of system(s) and/or device(s) that host security platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host security platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105. Application 220-1 may eliminate a need to install and execute the software applications on client device 105. For example, application 220-1 may include software associated with security platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of client device 105 or an operator of security platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 230 may receive information from and/or transmit information to client device 105 and/or security platform 115.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
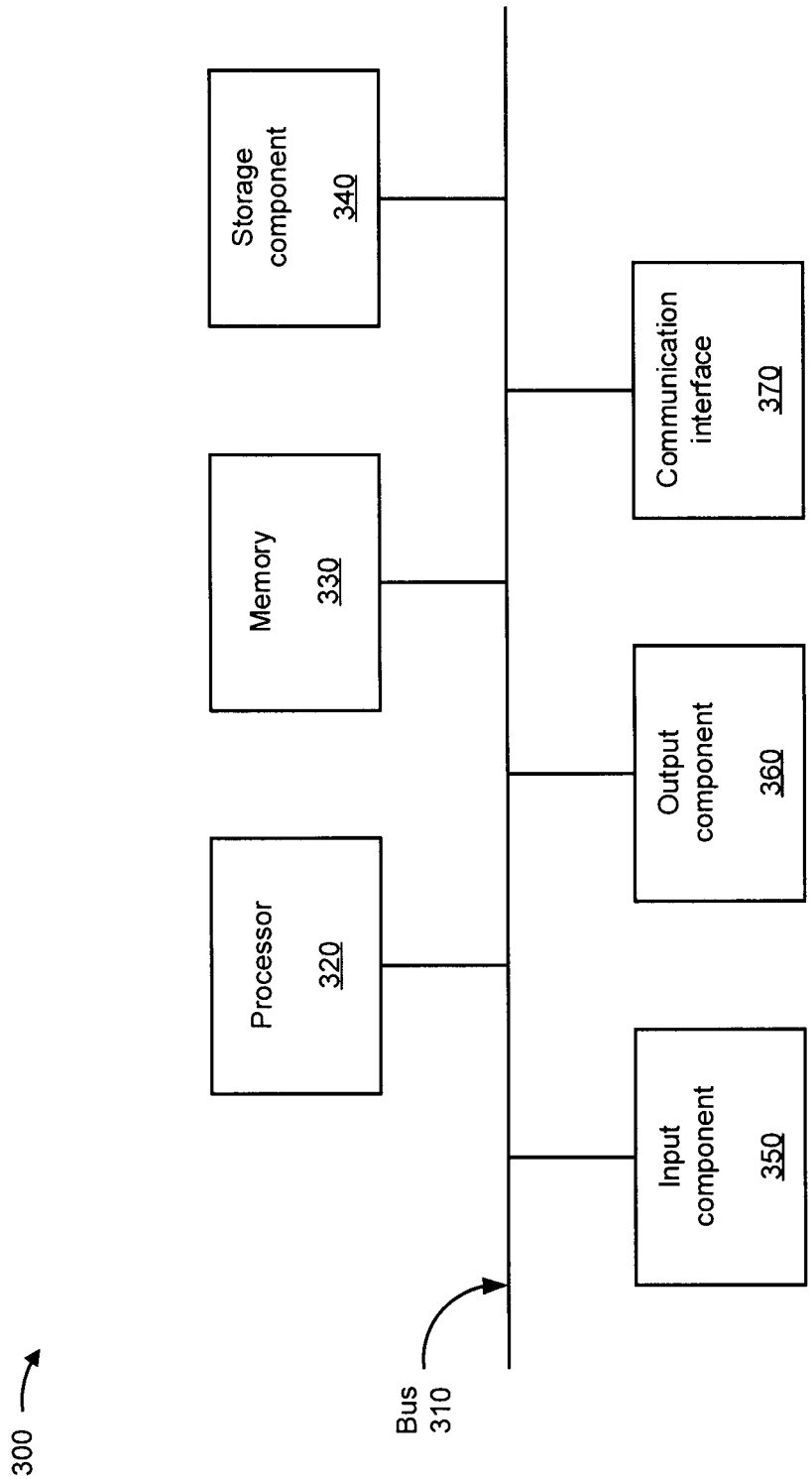
FIG. 3 is a diagram of example components of one or more devices of FIG. 2.

FIG. 3 is a diagram of example components of a device 300. Device 300 may correspond to client device 105, server device 110, security platform 115, and/or computing resource 220. In some implementations, client device 105, server device 110, security platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing quantum entropy for secure virtual private network connections. In some implementations, one or more process blocks of FIG. 4 may be performed by a device (e.g., security platform 115). In some implementations, one or more process blocks of FIG. 4 may be performed by another device or a group of devices separate from or including the device, such as a client device (e.g., client device 105) and/or a server device (e.g., server device 110).

As shown in FIG. 4, process 400 may include establishing a connection with a first server device based on a request to establish a peer-to-peer connection between a first client device, associated with the first server device, and a second client device associated with a second server device (block 410). For example, the device (e.g., using computing resource 220, processor 320, memory 330, communication interface 370, and/or the like) may establish a connection with a first server device based on a request to establish a peer-to-peer connection between a first client device, associated with the first server device, and a second client device associated with a second server device, as described above. The device may be associated with a software defined perimeter virtual private network.

As further shown in FIG. 4, process 400 may include generating a plurality of quantum random numbers based on establishing the connection with the first server device and based on the request to establish the peer-to-peer connection (block 420). For example, the device (e.g., using computing resource 220, processor 320, storage component 340, and/or the like) may generate a plurality of quantum random numbers based on establishing the connection with the first server device and based on the request to establish the peer-to-peer connection, as described above. The plurality of quantum random numbers may include unbiased random variable numbers with linear independence, non-repeating patterns, and non-dominant frequencies. In some implementations, generating the plurality of quantum random numbers may include generating the plurality of quantum random numbers by a plurality of quantum random number generators.

As further shown in FIG. 4, process 400 may include generating encryption keys for the first client device and the second client device based on the plurality of quantum random numbers (block 430). For example, the device (e.g., using computing resource 220, processor 320, memory 330, and/or the like) may generate encryption keys for the first client device and the second client device based on the plurality of quantum random numbers, as described above.

As further shown in FIG. 4, process 400 may include providing the encryption keys to the first client device and the second client device to cause an encrypted peer-to-peer connection to be established between the first client device and the second client device, via an interface provided between the first server device and the second server device (block 440). For example, the device (e.g., using computing resource 220, processor 320, memory 330, storage component 340, communication interface 370, and/or the like) may provide the encryption keys to the first client device and the second client device to cause an encrypted peer-to-peer connection to be established between the first client device and the second client device, via an interface provided between the first server device and the second server device, as described above. The encrypted peer-to-peer connection may include a virtual private network between the first client device and the second client device.

In some implementations, providing the encryption keys to the first client device and the second client device may include utilizing an entropy-as-a-service to provide the encryption keys to the first client device and the second client device. The encrypted peer-to-peer connection may enable communication of encrypted data between the first client device and the second client device.

In some implementations, providing the encryption keys to the first client device and the second client device may include providing the encryption keys to the first client device and the second client device in near-real time relative to establishing the connection with the first server device.

Process 400 may include additional implementations, such as any single implementation or any combination of implementations described below and/or in connection with one or more other processes described elsewhere herein.

In some implementations, process 400 may include establishing another connection with the second server device based on data indicating consent of the second client device to establish the peer-to-peer connection with the first client device, and generating the plurality of quantum random numbers based on establishing the connection with the first server device, the request to establish the peer-to-peer connection, and establishing the other connection with the second server device.

In some implementations, process 400 may include establishing another connection with a third client device based on another request to establish another peer-to-peer connection between the first client device and the third client device; generating another plurality of quantum random numbers based on establishing the other connection with the third client device and based on the other request to establish the other peer-to-peer connection; generating additional encryption keys for the first client device and the third client device based on the other plurality of quantum random numbers; and providing the additional encryption keys to the first client device and the third client device to cause another encrypted peer-to-peer connection to be established between the first client device and the third client device, via another interface provided between the first client device and the third client device.

In some implementations, providing the additional encryption keys to the first client device and the third client device may include utilizing an entropy-as-a-service to provide the additional encryption keys to the first client device and the third client device. The other encrypted peer-to-peer connection may enable communication of encrypted data between the first client device and the third client device.

In some implementations, process 400 may include utilizing a peer-to-peer-as-a-service to manage utilization of the encryption keys by the first client device and the third client device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    establishing, by a device, a connection with a first server device based on a request to establish a peer-to-peer connection between a first client device, associated with the first server device, and a second client device associated with a second server device;
    generating, by the device, a plurality of quantum random numbers based on establishing the connection with the first server device and based on the request to establish the peer-to-peer connection;
    generating, by the device, encryption keys for the first client device and the second client device based on the plurality of quantum random numbers;
    wherein the plurality of quantum random numbers include unbiased random variable numbers with linear independence, non-repeating patterns, and non-dominant frequencies; and
    providing, by the device, the encryption keys to the first client device and the second client device to cause an encrypted peer-to-peer connection to be established between the first client device and the second client device, via an interface provided between the first server device and the second server device.

2. The method of claim 1, wherein providing the encryption keys to the first client device and the second client device comprises:
    utilizing an entropy-as-a-service to provide the encryption keys to the first client device and the second client device.

3. The method of claim 1, wherein the encrypted peer-to-peer connection enables communication of encrypted data between the first client device and the second client device.

4. The method of claim 1, wherein the device is associated with a software defined perimeter virtual private network.

5. The method of claim 1, wherein generating the plurality of quantum random numbers comprises:
    generating the plurality of quantum random numbers by a plurality of quantum random number generators.

6. The method of claim 1, further comprising:
    establishing another connection with the second server device based on data indicating consent of the second client device to establish the peer-to-peer connection with the first client device, and
    wherein generating the plurality of quantum random numbers comprises:
        generating the plurality of quantum random numbers based on:
            establishing the connection with the first server device,
            the request to establish the peer-to-peer connection, and
            establishing the other connection with the second server device.

7. A device, comprising:
    one or more processors configured to:
    establish a connection with one of a first server device or a second server device based on a request to establish a peer-to-peer connection between a first client device, associated with the first server device, and a second client device associated with the second server device;
    generate a plurality of quantum random numbers based on establishing the connection with the first server device or the second server device and based on the request to establish the peer-to-peer connection;
    generate encryption keys for the first client device and the second client device based on the plurality of quantum random numbers;
    wherein the plurality of quantum random numbers include unbiased random variable numbers with linear independence, non-repeating patterns, and non-dominant frequencies; and
    provide the encryption keys to the first client device and the second client device to cause an encrypted peer-to-peer connection to be established between the first client device and the second client device, via an interface provided between the first server device and the second server device.

8. The device of claim 7, wherein the one or more processors are further configured to:
    establish another connection with a third client device based on another request to establish another peer-to-peer connection between the first client device and the third client device;
    generate another plurality of quantum random numbers based on establishing the other connection with the third client device and based on the other request to establish the other peer-to-peer connection;
    generate additional encryption keys for the first client device and the third client device based on the other plurality of quantum random numbers; and
    provide the additional encryption keys to the first client device and the third client device to cause another encrypted peer-to-peer connection to be established between the first client device and the third client device, via another interface provided between the first client device and the third client device.

9. The device of claim 8, wherein the one or more processors are further configured to:
    utilize a peer-to-peer-as-a-service to manage utilization of the encryption keys by the first client device and the third client device.

10. The device of claim 8, wherein the one or more processors, when providing the additional encryption keys to the first client device and the third client device, are configured to:
    utilize an entropy-as-a-service to provide the additional encryption keys to the first client device and the third client device.

11. The device of claim 8, wherein the other encrypted peer-to-peer connection enables communication of encrypted data between the first client device and the third client device.

12. The device of claim 7, wherein the one or more processors, when providing the encryption keys to the first client device and the second client device, are configured to:
    provide the encryption keys to the first client device and the second client device in near-real time relative to establishing the connection with the first server device.

13. The device of claim 7, wherein the encrypted peer-to-peer connection includes a virtual private network between the first client device and the second client device.

14. A non-transitory computer-readable medium storing instructions, the instructions comprising:
    one or more instructions that, when executed by one or more processors, cause the one or more processors to:
        establish a connection with a first server device based on a request to establish a peer-to-peer connection between a first client device, associated with the first server device, and a second client device associated with a second server device;

generate a plurality of quantum random numbers, that include unbiased random variable numbers with linear independence, non-repeating patterns, and non-dominant frequencies, based on establishing the connection with the first server device and based on the request to establish the peer-to-peer connection;

generate encryption keys for the first client device and the second client device based on the plurality of quantum random numbers; and utilize an entropy-as-a-service to provide the encryption keys to the first client device and the second client device to cause an encrypted peer-to-peer connection to be established between the first client device and the second client device, via an interface provided between the first server device and the second server device.

15. The non-transitory computer-readable medium of claim 14, wherein the encrypted peer-to-peer connection enables communication of encrypted data between the first client device and the second client device.

16. The non-transitory computer-readable medium of claim 14, wherein the instructions further comprise:
one or more instructions that, when executed by the one or more processors, cause the one or more processors to:
establish another connection with the second server device based on data indicating consent of a user of the second client device to establish the peer-to-peer connection with the first client device, and
wherein the one or more instructions, that cause the one or more processors to generate the plurality of quantum random numbers, cause the one or more processors to:
generate the plurality of quantum random numbers based on:
establishing the connection with the first server device,
the request to establish the peer-to-peer connection, and
establishing the other connection with the second server device.

17. The non-transitory computer-readable medium of claim 14, wherein the instructions further comprise:
one or more instructions that, when executed by the one or more processors, cause the one or more processors to:
establish another connection with a third client device based on another request to establish another peer-to-peer connection between the first client device and the third client device;
generate another plurality of quantum random numbers based on establishing the other connection with the third client device and based on the other request to establish the other peer-to-peer connection;
generate additional encryption keys for the first client device and the third client device based on the other plurality of quantum random numbers; and
provide the additional encryption keys to the first client device and the third client device to cause another encrypted peer-to-peer connection to be established between the first client device and the third client device, via another interface provided between the first client device and the third client device.

18. The non-transitory computer-readable medium of claim 14, wherein the one or more instructions, that cause the one or more processors to provide the encryption keys to the first client device and the second client device, cause the one or more processors to:
provide the encryption keys to the first client device and the second client device in near-real time relative to establishing the connection with the first server device.

19. The non-transitory computer-readable medium of claim 14, wherein the encrypted peer-to-peer connection includes a virtual private network between the first client device and the second client device.

* * * * *